(12) United States Patent
Shi et al.

(10) Patent No.: US 10,573,303 B2
(45) Date of Patent: Feb. 25, 2020

(54) METHOD AND APPARATUS FOR VOICE CONTROL

(71) Applicant: Alibaba Group Holding Limited, Georgetown, Grand Cayman (KY)

(72) Inventors: Shanwen Shi, Hangzhou (CN); Boxue Zhang, Hangzhou (CN); Lijuan Cai, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 90 days.

(21) Appl. No.: 15/083,778

(22) Filed: Mar. 29, 2016

(65) Prior Publication Data

US 2016/0293164 A1    Oct. 6, 2016

(30) Foreign Application Priority Data

Mar. 30, 2015    (CN) .......................... 2015 1 0146261

(51) Int. Cl.
  *G10L 15/22*    (2006.01)
  *G06F 3/16*    (2006.01)
  *G10L 15/18*    (2013.01)
  *G06F 3/0484*    (2013.01)

(52) U.S. Cl.
  CPC .......... *G10L 15/22* (2013.01); *G06F 3/04842* (2013.01); *G06F 3/167* (2013.01); *G10L 15/1815* (2013.01); *G10L 2015/223* (2013.01); *G10L 2015/228* (2013.01)

(58) Field of Classification Search
  CPC ....... G10L 19/167; G10L 19/24; G10L 25/78; G10L 19/02; G10L 15/02; G10L 25/90; G10L 25/40; G06F 9/48; G06F 3/04883; G06F 3/16

USPC .......................................... 704/206, 207, 9, 8
See application file for complete search history.

(56) References Cited

U.S. PATENT DOCUMENTS

| 8,930,194 | B2 | 1/2015 | Newman et al. |
| 8,954,334 | B2 | 2/2015 | Newman |
| 8,965,764 | B2 | 2/2015 | Ryu et al. |
| 8,977,255 | B2 | 3/2015 | Freeman et al. |
| 8,983,641 | B2 | 3/2015 | Chuang et al. |
| 8,996,386 | B2 | 3/2015 | Alasry et al. |

(Continued)

FOREIGN PATENT DOCUMENTS

| CN | 101410888 | 4/2009 |
| CN | 103500578 | 1/2014 |

(Continued)

*Primary Examiner* — Akwasi M Sarpong

(57) ABSTRACT

The present invention provides a voice control method and apparatus that increases the efficiency of voice control. In one exemplary method, a voice system receives a voice command input by a user and determines if the voice command is related to a foreground application. If the voice command is determined to relate to the foreground application, a control command corresponding to the voice command is sent to the foreground application to cause the foreground application to execute the control command. If the voice command is determined to not relate to the foreground application, a background application is identified and the control command corresponding to the voice command is sent to the identified background application to cause the background application to execute the control command.

18 Claims, 3 Drawing Sheets

(56) References Cited

U.S. PATENT DOCUMENTS

| | | |
|---|---|---|
| 9,002,714 B2 | 4/2015 | Kim et al. |
| 9,020,823 B2 | 4/2015 | Hoepken et al. |
| 9,066,167 B2 | 6/2015 | Goldstein et al. |
| 9,081,550 B2 | 7/2015 | Oz et al. |
| 9,118,967 B2 | 8/2015 | Sirpal et al. |
| 9,153,232 B2 | 10/2015 | Zhang |
| 9,190,062 B2 | 11/2015 | Haughay |
| 9,195,305 B2 | 11/2015 | Markovic et al. |
| 9,262,612 B2 | 2/2016 | Cheyer |
| 9,263,058 B2 | 2/2016 | Huang et al. |
| 9,264,801 B2 | 2/2016 | Contolini et al. |
| 9,275,642 B2 | 3/2016 | Abdossalami et al. |
| 9,305,554 B2 | 4/2016 | Jagatheesan et al. |
| 2008/0024844 A1* | 1/2008 | Yabe .................. H04N 1/6022 358/518 |
| 2008/0162138 A1* | 7/2008 | Gurram .................. G06F 3/167 704/257 |
| 2010/0066837 A1* | 3/2010 | Kwong .................. H04N 9/73 348/180 |
| 2012/0245941 A1* | 9/2012 | Cheyer .................. G06F 21/32 704/246 |
| 2013/0227419 A1* | 8/2013 | Lee .......................... G06F 9/48 715/728 |
| 2014/0019873 A1* | 1/2014 | Gupta .................. H04L 67/36 715/744 |
| 2015/0254057 A1* | 9/2015 | Klein .................. G06F 3/167 704/275 |
| 2015/0331665 A1 | 11/2015 | Ishii et al. |
| 2015/0334484 A1 | 11/2015 | Usher et al. |
| 2015/0340040 A1 | 11/2015 | Mun et al. |
| 2015/0351074 A1* | 12/2015 | Vyas .................. H04W 68/005 455/414.2 |
| 2015/0379986 A1 | 12/2015 | Golding et al. |
| 2016/0071521 A1 | 3/2016 | Haughay |
| 2016/0080628 A1 | 3/2016 | Konicek |

FOREIGN PATENT DOCUMENTS

| | | |
|---|---|---|
| CN | 103591947 | 2/2014 |
| CN | 103593230 | 2/2014 |
| CN | 104076916 | 10/2014 |
| CN | 104335012 | 2/2015 |

\* cited by examiner

METHOD AND APPARATUS FOR VOICE CONTROL

This application claims priority to Chinese Patent Application No. 201510146261.9, filed on Mar. 30, 2015, which is incorporated herein by reference in its entirety.

TECHNICAL FIELD

The present disclosure relates generally to the field of computer technology and, more particularly, to methods and apparatuses for voice control.

BACKGROUND

With the rapid development of computer information technology, interactions between people and machines have extended from physical contact to voice control and have improved the convenience of the interactions.

Existing techniques in voice control use voice assistants installed on terminal devices, such as a vehicle-navigation system, a mobile phone, or a computer. In particular, users input voice commands through the voice assistants and the voice assistants execute related tasks according to the voice commands. This process is also referred to as voice control. The voice assistant usually needs the application related to the voice commands input by a user to execute those voice commands during the process of voice control.

In one exemplary use case, after a user launches a certain application (the first application) using the voice assistant, a user may launch another application (the second application) using the voice assistant. The second application will be running in the foreground and the first application, which was launched earlier, will be switched to the background. Moreover, in some situations, the user may still need to input additional voice commands using the voice assistant after the second application is launched and running in the foreground, to let the first application execute subsequent or advanced voice commands.

However, existing voice assistants can only control the foreground application to execute the voice commands for the foreground application, but cannot control a background application to execute advanced voice commands, which results in low voice controlling efficiency. For example, if a voice assistant receives a voice command input by a user requesting, "Play Dehua Liu's music" the voice assistant will run a music application in the foreground and instruct or otherwise cause the music application to execute the voice command to play a song of Dehua Liu's. If the voice assistant then receives a voice command input by the user asking, "Where am I?" the voice assistant would switch the music application from the foreground to the background and launch or run a map application in the foreground to ascertain the user's current location using the map application. When the voice assistant receives another voice command input from the user requesting, "Play another song of Dehua Liu's" the voice assistant determines that the current foreground application, the map application, is not relevant to the request "Play another song of Dehua Liu's." The voice assistant will provide feedback to the user, for example, "Sorry, I don't know what you are saying" and/or fail to execute the voice command, "Play another song of Dehua Liu's," which results in low voice controlling efficiency.

What is need is a method for voice control that is more efficient and addresses these deficiencies.

SUMMARY

According to one embodiment of the present disclosure, a method for voice control is disclosed that includes receiving a voice command input by a user. The method also includes determining if the voice command is related to a foreground application. If the voice command is related to the foreground application, the method includes sending a control command corresponding to the voice command to the foreground application to execute the control command. Additionally, if the voice command is related to a background application, the method also includes sending the control command corresponding to the voice command to the background application to cause the background application to execute the control command.

In another embodiment according to the present disclosure, an apparatus for voice control is disclosed. The apparatus includes a main memory and a processor coupled to the main memory that receives a voice command input by a user, determines if the voice command is related to a foreground application, sends a control command corresponding to the voice command to the foreground application to cause the foreground application to execute the control command when the voice command is determined to be related to the foreground application, and determines a background application related to the voice command from a set of background applications when the voice command is determined to not be related to the foreground application, and sends the control command corresponding to the voice command to the background application related to the voice command to cause the background application to execute the control command.

The present disclosure provides a method and device for voice control by having a voice system receiving a voice command, determining if the voice command is related to a foreground application, sending a control command corresponding to that voice command to a foreground application to cause it to execute the control command if the voice command is determined to be related to that foreground, and sending the control command to a background application to cause it to execute the control command if the voice command is determined not to be related to that background application. Therefore, the voice system can control voice commands based on the foreground applications and advanced voice commands based on background applications, which improves the voice controlling efficiency.

DESCRIPTION OF DRAWINGS

Embodiments of the present disclosure will be better understood based on the following detailed description, taken in conjunction with the accompanying figures, in which like reference characters designate like elements and in which.

DESCRIPTIONS

Figure 1:
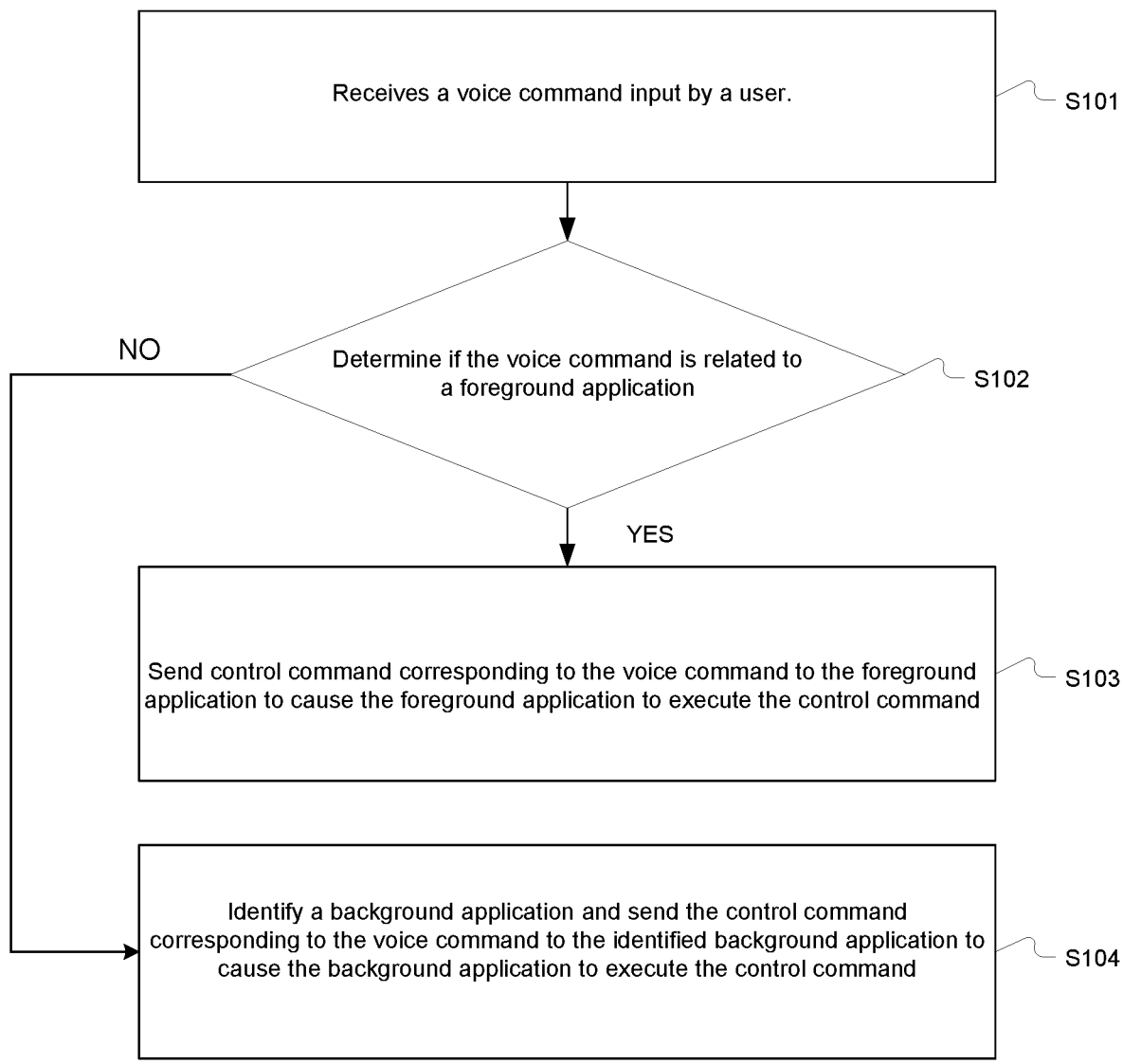
FIG. 1 is a flowchart of an exemplary sequence of computer-implemented steps for executing a method for voice control in accordance with an embodiment of the present disclosure.

The details of one or more embodiments of the disclosure are set forth in the accompanying drawings and the descrip- FIG. 1 is a flowchart of an exemplary sequence of computer-implemented steps for executing a method for voice control according to embodiments of the present disclosure. The method includes the following steps:

In step S101, a voice command input from a user is received by a voice system.

According to some embodiments, the voice system is installed on a terminal device. The voice system receives voice commands input by users and sends control commands based on the voice commands to associated applications causing the applications to execute the received control commands. The terminal devices may include, but are not limited to, mobile phones, portable computers, vehicle navigations, etc.

While running an application, a user may need to input a voice command to the voice system so that the voice system receives the voice command. For example, when a user wants to listen to music while driving and requests this of the voice system, the voice system receives the voice command, "I want to listen to music" from the user. When a music application receives the control command corresponding to the voice command, the music application displays an interface related to the voice command in the music application, such as displaying a music list for the user to select a song to be played from. When the user wants to listen to the third song in the music list, the voice system receives the voice command "Select the third song" from the user. When the music application is running in the foreground and playing the third song, and the user wants to know their current location, the voice system receives the voice command "Where am I?" from the user.

Two of these exemplary voice commands, "I want to listen to music" and "Select the third song" are related to the music application, while the voice command, "Where am I?" is related to a map application. The voice commands, "I want to listen to music" and "Where am I?" need the voice system to execute a new task or application and can be referred to as "initial commands." The voice command, "Select the third song" is based on the initial command, "I want to listen to music" and can be referred to as a "procedural command."

According to some embodiments, when an application is running in the foreground, its interface will be displayed, and an application running in the background will not have its interfaces displayed. Therefore, as long as the interface of an application is being displayed, the application is running in the foreground. When an application is running in the foreground, its interface will be displayed.

In step S102, it is determined if the voice command is related to the foreground application. If the voice command is related to the foreground application, step S103 is executed; otherwise, step S104 is executed.

According to some embodiments, the voice system can determine whether the voice command is related to the foreground application based on the content of that voice command. The applications installed in the voice system include instant messaging applications, map applications, music applications, video applications, and other various types of applications. Some of these applications may run in the foreground, some may run in the background, and some other applications may not be launched. For example, assuming a music application is running in the foreground and a map application is running in the background, when the voice system receives a voice command saying, "I want to listen to the next song" the content of the voice command can be interpreted as, "I want to listen to music, the next song specifically." The voice system determines, based on the content of that voice command, that the voice command is related to the music application running in the foreground and sends a control command corresponding to the voice command, "I want to listen to the next song," to the music application to cause the music application to execute the control command corresponding to that voice command. If the voice system receives a voice command asking "Where am I?" the content of that voice command is interpreted as, "Determine the current location." The voice system can determine, based on the content of the voice command, that the voice command is not related to the music application running in the foreground. The voice system determines that a map application in the background is related to the voice command and sends the control command corresponding to the voice command to that map application to let the map application execute the control command.

When determining whether the voice command is related to the foreground application based on the content of the voice command, voice systems need to analyze or interpret the content of each voice command and then traverse each of the foreground applications to determine if any of the foreground applications are related to the voice command based on the content of the voice command. This method is an inefficient means of determining applications, which leads to a high cost for the voice system. Instead, according to some embodiments, applications are categorized into three different types based on their executing statuses: unlaunched applications, foreground applications, and background applications. Unlaunched applications, foreground applications, and background applications correspond to three types of commands: a first command type, a second command type, and a third command type, respectively. The specific method of determining if a certain type of voice command is related to the foreground application can be preset for different command types. From the different preset command types, the command type which best matches the received voice command is determined. The voice system also determines if the voice command is related to the foreground application based on the command type.

According to some embodiments, the command type which best matches the received voice command can be determined from the preset command types according to keywords and/or semantics of the voice command. In particular, different keywords can be preset for different command types, where each command type corresponds to a set of keywords formed by several keywords; if the keyword of the received voice command matches one of the preset keywords of a command type, the application related to the voice command can be determined based on that command type. Moreover, different semantics can be preset for different command types, where each command type corresponds to a set of voice semantics formed by several semantics; if the semantics of the received voice command match one of the preset semantics of a command type, the application which the voice command is related to can be determined based on that command type.

In one example, assuming that the preset command types include commands related to music applications and commands related to map applications, when the voice system receives the voice command "I want to listen to music" the keyword in the voice command "music" can be used to determine that the voice command matches the preset command type related to the music applications. The voice system then determines that the voice command is related to the music application. When the voice command received by the voice system is, "Where am I?" a semantics analyzing tool can be used to analyze and interpret the voice command. When semantics of "Determine the current geographic location" is obtained from the analyzing tool, the map application for determining current geographic locations in response to voice commands will be determined.

The analyzing tool can be located at the terminal side or at the network side. When the analyzing tool is located at the network side, the voice system can send the voice command from the user from the terminal to a server at the network side. After the server has analyzed the semantics of the voice command, data produced by the analysis will be sent to the voice system at the terminal side and used by the voice system to determine related or associated applications.

In step S103, the control command corresponding to the voice command is sent to the foreground application to cause the foreground application to execute the control command.

According to some embodiments, when the voice command is determined to be related to the foreground application, the voice command is determined to be based on the foreground application or the interface of the foreground application. Therefore, the control command corresponding to the voice command is sent directly to the foreground application to cause the foreground application to execute the control command based on the voice command.

In step S104, the application related to the voice command is determined or ascertained from the background applications, and the control command corresponding to the voice command is sent to the background application to cause the background application to execute the control command.

According to some embodiments, when the voice command is determined not to be related to the foreground application, it is determined that the voice command is not based on the interface content and is probably based on an application in the background or on an application which is unlaunched. Therefore, it is first determined if the voice command is related to an application in the background; if so, the control command corresponding to the voice command is sent to the determined background application to let the background application execute the control command.

According to some embodiments, the control command can be preset according to the content of the voice command. The control command is used for causing an unlaunched application to launch in the foreground to display its interface when the voice command is determined to be related to the unlaunched application. The control command can also be used for causing the determined background application to be switched to the foreground and to display its interface. For example, the control command for the voice command, "I want to listen to music" can be "If the music application is running in the background, switch it to the foreground, display the music list, and play the first song" or, "If the music application is not launched, launch the music application in the foreground, display the music list, and play the first song."

In another example, the control command for the voice command, "Where am I?" can be "If the map application is running in the background, switch it to the foreground, display an electronic map, and identify the current geographic location" or, "If the map application is not launched, launch the map application in the foreground, display the electronic map, and identify the current geographic location."

For example, if an unlaunched music application receives the control command sent from the voice system, "If the music application is not launched, launch the music application on the foreground, display the music list, and play the first song" or, "If the music application is running in the background, switch it to the foreground, display the music list, and play the first song" the voice system would send a control command causing the music application to be launched in the foreground, to display the music list, and to play the first song.

If the music application is running in the foreground and playing music, and the voice system receives another voice command "Where am I?" the voice system determines that the voice command is related to the map application and sends the control command, "If the map application is running in the background, switch it to the foreground, display an electronic map, and identify the current geographic location" or, "If the map application is not launched, launch the map application in the foreground, display the electronic map, and identify the current geographic location" to the map application to causing it to launch in the foreground, to display an electronic map and/or to identify the current geographic location. Meanwhile, since the music application and the map application are independent of each other, the music application does not quit operation, but runs in the background. The music application may run in the background to play music in the background, for example.

In the exemplary method depicted in FIG. 1, the voice system receives the voice command input by the user and determines if the voice command is related to the foreground application. If so, the control command corresponding to the voice command will be sent to the foreground to let the foreground application execute the control command; otherwise, the application related to the voice command will be determined based on background applications and the control command corresponding to the voice command will be sent to the determined background application to cause it to execute the control command. In this way, the voice system can control the foreground application to execute the voice command based on the foreground application and control the background application to execute an advanced voice command which improves the efficiency of the voice control.

For example, when the voice system receives the voice command, "I want to listen to music from the user, the voice system launches the music application related to the voice command in the foreground. When the voice system receives a voice command "Where am I?" while playing music, it launches the map application and switches the music application to the background. When the voice system again receives another voice command related to the music application, such as "I want to listen to the next song" the voice system determines if this voice command is related to the map application which is the current foreground application. If the voice command is not related to the map application, the voice system will determine if the voice command, "I want to listen to the next song" is related to the music application which is the current background application. If the voice command is determined to be related to the music application, the control command corresponding to the voice command will be sent to the music application to cause the music application to play the next song, for example.

In the exemplary method depicted in FIG. 1, the voice system is a voice operated system. The voice system controls the applications in the voice system to execute control commands, where the voice system can control the entire system.

According to some embodiments, when the voice command received is not related to either the foreground application or the background application, the voice system identifies an application from the unlaunched applications which is related to the voice command. The foreground application is then switched to the background and the application related to the voice command is launched. The control command corresponding to the voice command will be sent to the foreground application determined to be related to the voice command to let the foreground application execute the control command.

The voice system described herein can implement multiple applications running simultaneously. The voice system supports concurrent applications, and the running application does not need to quit operation when a new application is launched. Moreover, when a voice command related to the background application is received (e.g., an advanced voice command), the background application can execute the voice command and be switched to the foreground.

In some cases, when the voice command input by the user is a procedural command based on an initial command, the voice system may be unable to determine the application associated with or related to the voice command based on the content of the voice command. For example, when the voice system receives a voice command saying, "I want to listen to music" and plays the first song in the interface of the foreground music application, the user may want to listen to the fifth song in the interface. When the voice command "Select the fifth" is received by the voice system, the voice system may be unable to determine which application is related to this voice command; therefore, it may be difficult to determine if this advanced voice command is related to the foreground application or not.

In order to improve the accuracy in determining if the voice command is related to the foreground application, according to some embodiments, the voice system may identify the command type of the voice command when determining if the voice command is related to the foreground application. In particular, the preset command types may include: a first command type, which is not related to either the foreground application or the background applications; a second command type, which is related to the foreground application; and a third command type, which is related to the background applications. The second command type, which is related to the foreground application, includes both the initial commands and the procedural commands based on the interfaces. The third command type, which is related to the background applications, includes both the initial commands and the procedural commands based on statuses. The first command type, which is not related to either the foreground application or the background application, usually includes the initial commands but not the procedural commands.

According to some embodiments, the initial commands are not related to historical commands, so the initial commands do not belong in the same conversation with the historical commands. The commands which are related directly to the historical commands or based on the historical commands are referred to as advanced commands or procedural commands. For example, when the voice system receives a voice command saying, "I want to listen to music," the voice command is not based on any voice command, but is instead an initial command which requires the voice system to execute a new task. When the voice system then receives a voice command saying, "Next song" that voice command is usually an advanced commands or procedural commands based on the initial voice command, "I want to listen to music."

The procedural commands and advanced commands are executed by launched applications. Any application, including launched applications and unlaunched applications, can execute initial commands. Since there are both foreground applications and background applications included in the launched applications, the procedural commands or the advanced commands can include both procedural commands based on interfaces, which can also be described as the procedural commands based on the foreground application, and the procedural commands or the advanced commands based on the statuses, which can also be described as the procedural commands based on the background applications. For example, the voice commands having the keywords including "launch," "I want," "where," etc. can be defined as initial commands; the voice commands having the semantics including, "The user wants to launch an application," "The user wants to determine current location," etc. can be defined as initial commands. For example, the voice commands having the keywords including "shut down," "switch," "select," "confirm," "cancel," etc. can be defined as procedural commands; the voice commands having the semantics including, "Switch the foreground application with the background application," "Select the content in the interface," etc. can be defined as procedural commands. For example, the voice commands having keywords including "previous," "next," "first," "last," "pause," "start," etc. can be defined as procedural commands; the voice commands having semantics including, "Switch to the previous," "Switch to the next," "Pause," etc. can be defined as procedural commands.

When the voice system receives the voice command input by the user, it determines a command type from the preset command types that matches the voice command. In particular, the command type can be determined by identifying keywords or semantics of the voice command.

For example, when using the semantics of a voice command to determine the command type, different command types have different semantics. Each command type corresponds to a set of semantics. For example, a first semantics set corresponding to a first command type, a second semantics set corresponding to a second command type, and a third semantics set corresponding to a third command type can be preset where the semantics in different semantic sets are different.

The process of determining the command type from the preset command types that best matches the voice command includes determining the semantics of the voice command. The process also includes searching for the preset semantic sets, based on the semantics of the voice command, to determine if there is a semantic which matches the semantics of the voice command and, if so, determining the command type corresponding to the semantics set where the semantics matching the voice command is located. In particular, the process includes determining the semantics of the voice command. The process also includes searching for the first semantics set which the first command type corresponds to based on the semantics of the voice command, the second semantics set corresponding to the second command type, and the third semantics set corresponding to the third command type, to determine if there is a semantic which matches the semantics of the voice command. If there is a semantic which matches the semantics of the voice command in the first semantics set, the first command type is determined to match the voice command; if there is a semantic which matches the semantics of the voice command in the second semantics set, the second command type is determined to match the voice command; and if there is a semantic which matches the semantics of the voice command in the third semantics set, the third command type is determined to match the voice command.

According to some embodiments, the process of determining if the voice command is related to the foreground application based on the command types includes: determining if the first command type matches the voice command. If so, the voice command is determined not to be related to either the foreground application or the background application; otherwise, the voice command is determined to be related to either the foreground application or the background application; or determining if the second command type matches the voice command. If so, the voice command is determined to be related to the foreground application; otherwise, the voice command is determined not to be related to the foreground application; or determining if the third command type matches the voice command. If so, the voice command is determined to be related to the background application; otherwise, the voice command is determined not to be related to the background application.

For example, when the voice system receives a voice command saying, "I want to listen to music" the voice system ascertains or identifies the keyword "I want" corresponding to an initial command in that voice command, determines that the voice command matches the initial command (also referred to as the first command type), and determines if the voice command is related to either the foreground application or the background application.

Based on the content displayed in the interface, the user can input a voice command after the music application displays the music list to the user. For example, the user can input the voice command "Select the third one." The music application is running in the foreground when the voice system identifies the keyword "select" corresponding to a procedural command associated with the displayed interface, so the voice command is determined to match the procedural command associated with the displayed interface. The voice command is therefore determined to be related to the foreground application, which is the foreground music application.

When the music application is running in the background, the user can change the music playing by inputting the voice command "Next song." The voice system identifies the keyword "next" corresponding to a procedural command associated with a status of the voice command, identifies the voice command matching the procedural command associated with the status, and determines that the voice command relates to the background application, which is the background music application.

According to some embodiments, when the command type of the voice command is determined to be a procedural command associated with the interface, the foreground application is determined to be related to the voice command; however, when there are multiple foreground applications, (e.g., the voice system controls multiple windows to run multiple applications), one of the foreground application needs to be identified as being related to the voice command.

During the process of identifying the related application from multiple foreground applications, the foreground applications can be monitored, and the interface of each of the applications running in the foreground being monitored by the voice system is pushed into a set stack; different applications correspond to different set stacks. Interfaces of the same application are located in the same set stack and interfaces of different applications are located in different set stacks. When the foreground application is determined to have exited the foreground, the interface of the application will be popped off the corresponding set stack.

When determining or ascertaining an application from multiple foreground applications which is related to the voice command, the set stacks can be searched to find a set stack having interfaces matching the content of the voice command, and the application corresponding to the found set stack is determined to be related to the voice command. In particular, the semantics or the keyword of the voice command can be determined and used to search for a matching interface, which has the same or similar content with the voice command, from the interfaces of multiple set stacks corresponding respectively to multiple foreground applications. When an interface is found that matches the semantics of the voice command, the application corresponding to that set stack will be identified as being the foreground application related to the voice command.

For example, when the voice system monitors both a map application and a music application running in the foreground, the interface of the music application includes a list of singers, and the interface of the map application includes an electronic map, the interfaces of both the map application and the music application are pushed into set stack 1 and set stack 2 respectively. When a received procedural command is associated with the interface, such as "Select Dehua Liu" both set stack 1 and set stack 2 will be searched for interfaces having content including "Dehua Liu" and set stack 2, which is the set stack that includes "Dehua Liu", it will be determined to match the semantics of the voice command. The music application corresponding to set stack 2 will be determined to be the foreground application associated with the semantics of the voice command.

According to some embodiments, before the voice system receives the voice command input by the user, a launching command needs to be received to wait for and receive the voice command input by the user. The launching command can either be sent from applications or not sent from the applications. Furthermore, for ease of operation of the users, after the voice system receives the launching command, the voice system can send user feedback information (e.g., a hint or tip), such as voices, texts, and icons, to suggest that the user can input a voice command at the moment. For example, the voice system can, output a tone and/or the message "Please input voice command" to the user.

According to some embodiments, a launching command that is received may not have been sent from an application. For example, launching commands may be sent by the user using a physical button or a soft button, such as an icon displayed on the touch screen at the terminal device, or input by the user via biological feature information, such as voices, face features, and/or fingerprints. When the voice system receives a launching command input by physical buttons or soft buttons, or a launching command input by the user using legitimate biological features, or launching commands sent from an application, the voice system will wait to receive the voice command from the user. The legitimate biological features may include biological feature information which matches preset stored biological feature information.

According to some embodiments, when receiving a launching command sent form the applications and followed by a voice command input by the user, the voice system can let the application which has sent the launching command execute the corresponding control command. The voice system can directly determine which application has sent the launching command associated with the voice command without having to determine the command type of the voice command or determine the related application based on the command type.

When the received launching command is not sent from an application, but is sent by pressing a physical button, or a soft button, or inputting biological feature information, the voice system must determine which application is used to execute the corresponding control command. A command type matching the voice command must be determined or ascertained from preset command types to determine which application is associated with the voice command based on the command type.

According to some embodiments, after the application has executed the control command, the application must send an execution result back to the voice system.

According to some embodiments, when receiving a preset command, a prompt window can be shown. The preset commands include, but are not limited to, voice commands input by the user or launching commands. In particular, when receiving the launching command, a prompt window can be displayed and identifiers can be displayed in the prompt window.

The prompt window can be used for displaying hint information, where the hint information can include the voice command received by the voice system, the execution results sent back from the application which has executed the control command corresponding to the voice command. When receiving the voice command input by the user, the voice command will be displayed in the prompt window. When receiving the execution result sent from the application after executing the control command corresponding to the voice command, the execution results will be displayed in the prompt window.

Furthermore, after the application has executed the control command and sent the execution results to the voice system, some hint information can be sent back together with the execution results to the voice system. The hint information is used for suggesting to the voice system that it needs to display the execution results, to broadcast the execution results, to require the user to input a voice command, etc. The voice system may stop operating when receiving corresponding hint information.

According to some embodiments, in order to avoid the prompt window blocking the interface of the application and affecting the convenience of the user's operations, the prompt window occupies only a portion of the screen. The prompt window may be a floating window that can be moved as needed to avoid obscuring content of the application's interface that the user may want to see.

According to some embodiments, in order to further avoid the prompt window blocking the interfaces of the applications, the prompt window will be hidden when a command to hide the prompt window has been received. Alternatively, the prompt window can be hidden or closed when no voice command input by the user is received in a preset first time interval since the application sent back the execution results after executing the control command. For example, the preset first time interval may be two seconds and the time interval starts when the execution results sent from the application are received. When no voice command input by the user is received within two seconds, the prompt window is hidden. When the application sends back the execution results, the countdown starts if it is determined that the user needs to input a voice command. When there is no request for the user to input a voice command, there is no need to record time or hide the prompt window. Moreover, the voice system can display hidden icons in the interface of the prompt window. The user can input the command of hiding the prompt window by clicking a hide icon of the interface.

According to some embodiments, the prompt window closes without affecting the operation of the running application. For example, when the music application is playing a song, the user inputs a voice command, "Play Dehua Liu's song." When the music application displays a hint, "Please input the target music" to the user in the prompt window and starts the countdown, if the voice system does not receive a voice command input by the user in two seconds, the prompt window closes, and the music application remains open and playing.

According to some embodiments, hint information can be displayed in both the prompt window and the interface of the foreground application and a control command has been executed. In particular, after the application associated with the voice command is determined or ascertained, the voice command received by the voice system and/or the execution results sent from the foreground application are displayed in the interface of the foreground application when there is a foreground application running.

In some cases an application may not respond to a control command. In order to avoid a situation where the application is not responding, and the user is waiting without being aware that the application is not responding, according to some embodiments, the voice system starts a countdown when the voice command is sent to the application. When no execution results are received in a preset second time interval, hint information will be displayed to the user, where the hint information indicates or suggests an error. When the user obtains the hint information, the user can close the application, or input the voice command again, for example.

Figure 2:
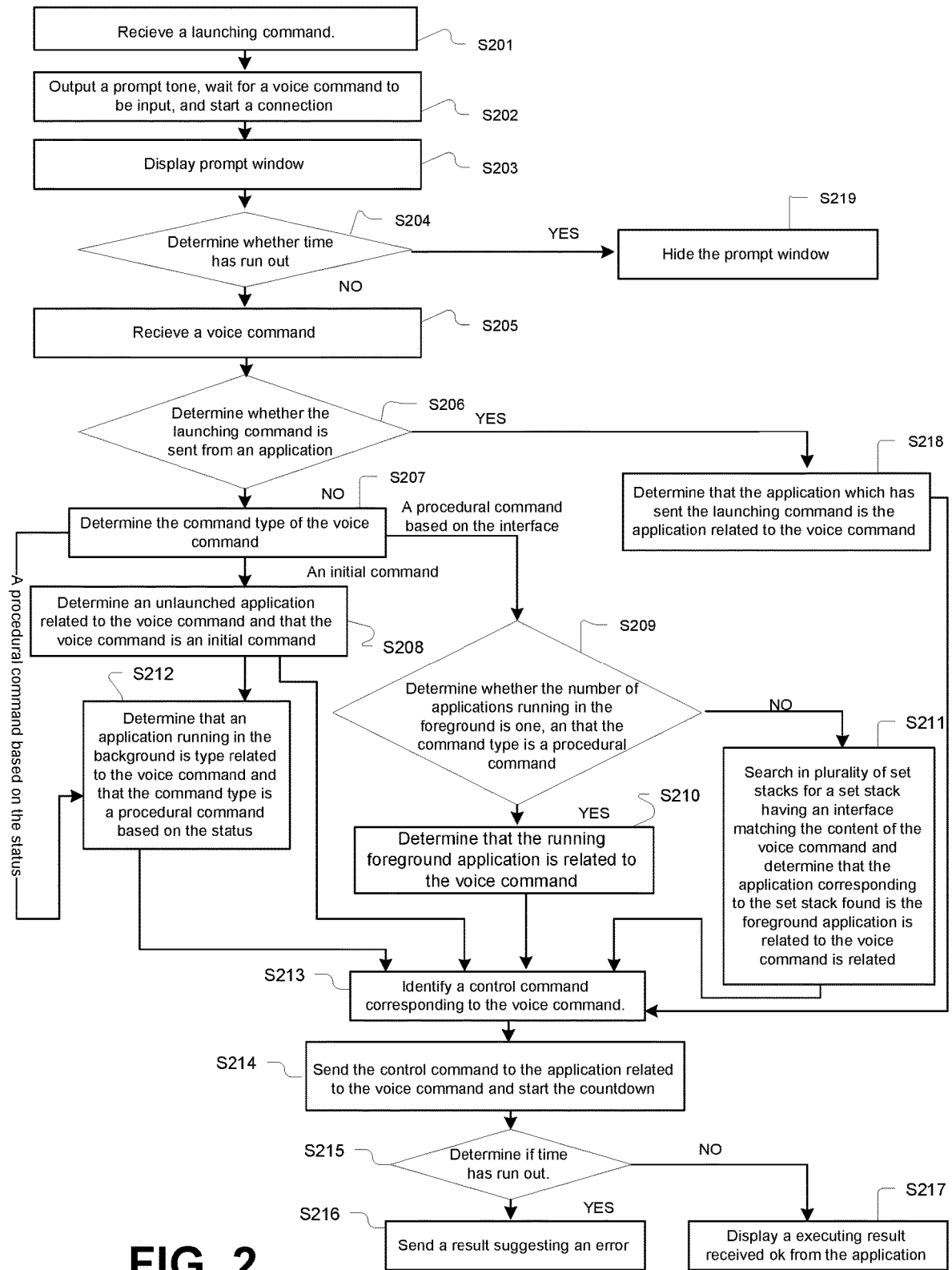
FIG. 2 is another flowchart of an exemplary sequence of computer-implemented steps for executing a method for voice control in accordance with an embodiment of the present disclosure.

With regard to FIG. 2, a flowchart of a sequence of computer implemented steps for performing a voice control method is depicted according to embodiments of the present invention. In step S201, a launching command is received that has been sent by a user pressing a physical button, a soft button, voice input, or an application sending a launching command. In step S202, a prompt and/or tone is indicating to wait for an input of a voice command is produced and a countdown starts. In step S203, a prompt window is displayed. In step S204, it is determined if the counted time exceeds a first preset time interval. If so, step S219 will be executed; otherwise, step S205 will be executed. In step S205, a voice command is received. In step S206, it is determined if the launching command is sent from an application. If so, step S218 will be executed; otherwise, step S207 will be executed. In step S207, a command type of the voice command is determined or ascertained. In step S208, the command type is determined to be an initial command, and an application associated with the voice command is identified from the unlaunched applications. In step S209, the command type is determined to be a procedural command and the number of applications running in the foreground is determined. In step S210, the foreground application is determined to be associated with the voice command. In step S211, a plurality of set stacks are searched to find a set stack having an interface matching the content of the voice command. The application corresponding to the set stack found is identified as the foreground application related to the voice command.

In step S212, the command type is determined to be the procedural command based on the status, and an application running in the background that is related to the voice command is ascertained from the background applications. In step S213, a control command corresponding to the voice command is ascertained. In step S214, the control command is sent to the application, which is ascertained related to the voice command, and the countdown is started.

In step S215, it is determined if the counted time exceeds a preset second time interval. If so, step S216 will be executed; otherwise, step S217 will be executed. In step S216, an error message is sent. In step S217, an execution result sent from the application is displayed. In step S218, the application which sent the launching command is determined or ascertained as the application associated with the voice command. In step S219, the prompt window is hidden.

Figure 3:
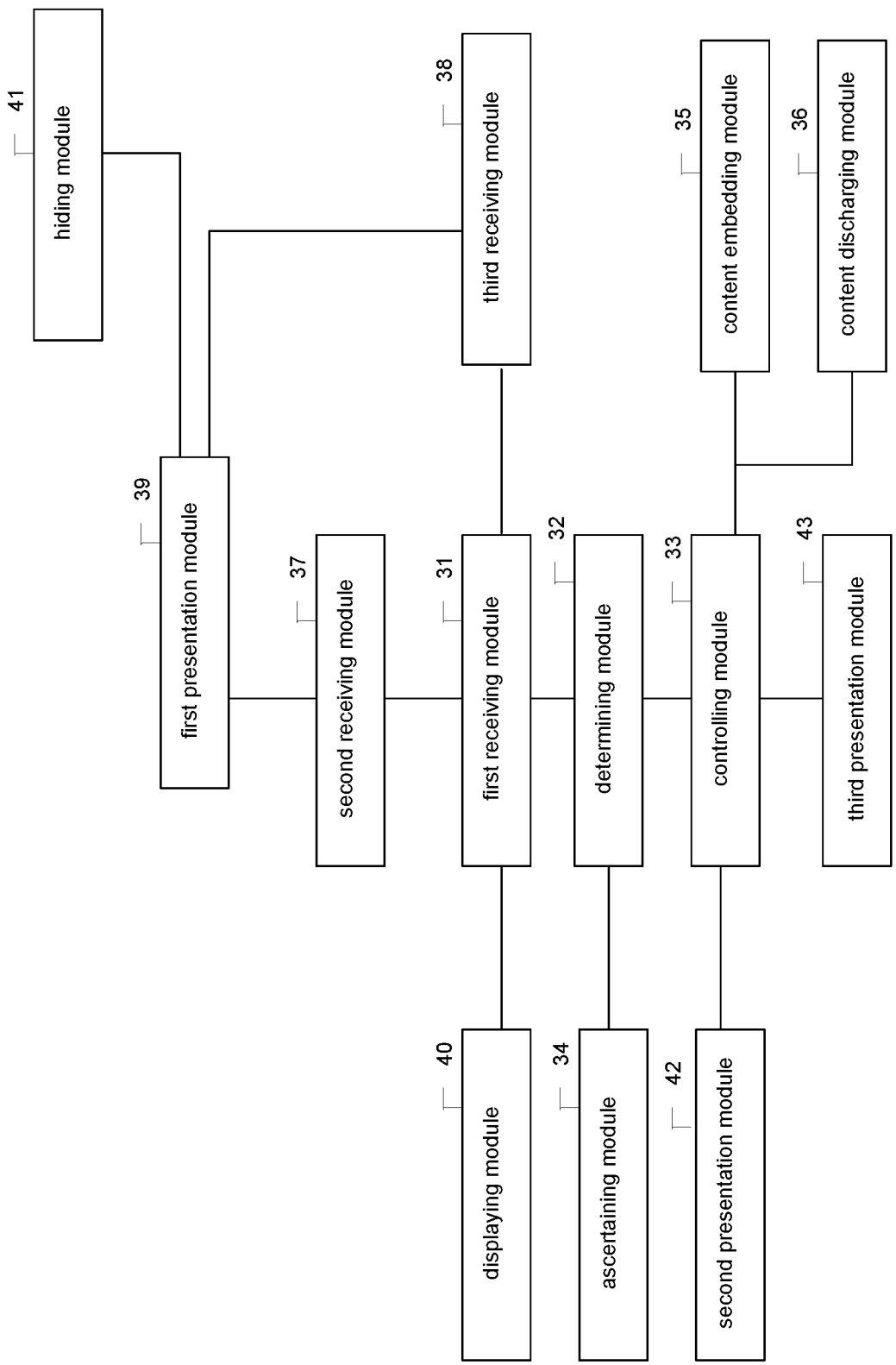
FIG. 3 is a block diagram of an exemplary device for voice control in accordance with an embodiment of the present disclosure.

With regard to FIG. 3, a block diagram of an exemplary device for voice control is depicted according to embodiments of the present disclosure. The device includes a first receiving module 31, a determining module 32, a controlling module 33, an ascertaining module 34, a content embedding module 35, a content discharging module 36, a second receiving module 37, a third receiving module 38, a first presentation module 39, a displaying module 40, a hiding module 41, a second presentation module 42, and a third presentation module 43.

First receiving module 31 is used for receiving a voice command input by a user. Determining module 32 is used for determining if the voice command is related to or associated with a foreground application. When the voice command is determined to be related to the foreground application by determining module 32, controlling module 33 is used for sending a control command corresponding to the voice command to the foreground application to let the foreground application execute the control command. Alternatively, when the voice command is determined to be unrelated to the foreground application by determining module 32, controlling module 33 is used for determining an application related to the voice command from the background applications and for sending the control command corresponding to the voice command to the determined background application to let the background application execute the control command. Determining module 32 is further used for determining a command type which matches the voice command from a preset set of command types and for determining, according to the command type of the voice command, if the voice command is related to the foreground application.

When the voice command is determined by determining module 32 to be unrelated to the foreground application or the background applications, the device also includes ascertaining module 34 used for ascertaining an application related to the voice command from the unlaunched applications, for switching the foreground application to the background, for launching the application related to the voice command in the foreground, and for sending the control command corresponding to the voice command to the foreground application to cause the foreground application to execute the control command.

According to some embodiments, the preset command types include a first command type not related to either an interface or a background application, a second command type related to the interface, and the third command type related to background applications.

Determining module 32 is further used for determining semantics of the voice command, for searching the preset semantic sets corresponding to the command types for a semantic which match the semantics of the voice command, and for determining, if there is a semantics which matches the semantics of the voice command, the command type of the identified semantics set.

Determining module 32 is further used for determining if the command type which matches the voice command is a first command type, and if the command type is the first command type, for identifying a voice command not related to either the foreground application or the background applications, and further for identifying a voice command related to either the foreground application or the background application when the command type is not the first command type.

Determining module 32 is further used for determining if the command type which matches the voice command is a second command type; if the command type is the second command type, for identifying a voice command to relate to the foreground application; and if the command type is not the second command type, for identifying a voice command not related to the foreground application.

Determining module 32 is further used for determining if the command type which matches the voice command is a third command type; if the command type is the third command type, for determining the voice command related to the background application; and if the command type is not the third command type, for determining the voice command not related to the background applications.

When a foreground application is monitored, the device also includes content embedding module 35 used for embedding interface content of the foreground application into a set stack corresponding to foreground applications. When the monitored foreground application exits the foreground, content discharging module 36 is used for discharging its interface content off of the set stack.

When more than one application is running in the foreground, determining module 32 is further used for searching for a set stack having the interface content matching the content of the voice command, and identifying the application corresponding to the found set stack as the foreground application associated with the voice command.

The device also includes second receiving module 37 used for receiving a launching command that was not sent from an application indicating to wait for the user to input the voice command until a voice command input from the user has been received. The device also includes third receiving module 38 used for receiving a launching command sent from the application indicating to wait for the user to input a voice command.

Controlling module 33 is further used for sending the control command corresponding to the voice command to the application that sent the launching command to cause that application to execute the control command.

The device also includes first presentation module 39 used for showing a prompt window when receiving a launching command. The prompt window displays an identifier suggesting that the user input the voice command. When receiving the voice command input by the user, displaying module 40 is used for displaying the voice command in the prompt window, and for displaying the execution result in the prompt window when receiving an execution result sent from the application after executing the control command. When receiving a command to hide the prompt window, hiding module 41 is used for hiding the prompt window, and for hiding the prompt window when no voice command input is received from the user within a preset time interval. The prompt window may be a floating window which does not occupy an entire screen.

The device also includes second presentation module 42 used for showing hint information to the user when no execution result is received in a preset second time interval since the control command was sent to the determined application. The device also includes third presentation module 43 used for showing the voice command received by the voice system when the application corresponding to the voice command is determined and there is a running foreground application, and/or the execution result sent from the foreground application after executing a control command in the interface of the application running in the foreground.

The voice system is operated by voice input. The voice operated system controls any one of the applications in the voice system to execute a control command.

The methods and devices for voice control provided by the present disclosure includes the voice system receiving a voice command input by a user and determining if the voice command is related to a foreground application. If the voice command is related to the foreground application, a control command corresponding to the voice command will be sent to the foreground application to allow it the execute the control command; otherwise, an application which is related to or associated with the voice command in the background applications will be identified and the voice command will be sent to the identified background application to allow it execute the control command. In this way, the voice system instructs the foreground applications to execute the voice commands associated with the foreground applications and instructs the background applications to execute advanced voice commands, improving the efficiency of voice control.

Those skilled in the art will understand that the present invention may be described in the forms of methods, systems, or computer program products. Therefore, the present disclosure can be embodied in the forms of entirely hardware, entirely software, or a combination of hardware and software. Moreover, the present disclosure can be embodied in the form of a computer program product which is implemented in one or multiple computer usable storage mediums incorporating computer usable programming codes, including but not limited to, magnetic disk storages, CD-ROMs, or optical storages.

The present disclosure is presented based on flow diagrams and/or block diagrams of methods, devices or systems, and computer program products of embodiments of the present disclosure. It should be understood that each one of the steps and/or blocks in the flow diagrams and/or block diagrams, as well as the combinations between each one of the steps/blocks in the flow and/or block diagrams, can be embodied by computer program commands. The computer program commands can be provided for general purpose computers, dedicated computers, embedded processors, or other processors of programmable data processing devices to generate a device that embodies, by computers or processors of other programmable data processing devices executing commands, appointed functions in one or multiple steps in the flow diagrams and/or one or multiple blocks in the block diagrams.

These computer commands can also be stored in computer-readable storage mediums that guide computers or other processor of programmable data processing devices and work in a specified manner to have the commands that are stored in the computer-readable storage mediums produce products that contain the commanding devices. The commanding devices embody appointed functions in one or multiple steps in the flow diagrams and/or one or multiple blocks in the block diagrams.

These computer program commands can also be loaded onto computers or other programmable data processing devices to produce computer-embodied processing by executing operations on computers or other programmable data processing devices to provide, on computers or other programmable data processing devices, steps to embody appointed functions that can be embodied in one or multiple steps in the flow diagrams and/or one or multiple blocks in the block diagrams.

In a typical configuration, a computing device includes one or multiple CPUs, input/output ports, network ports and memories. Memories can include computer-readable mediums, such as a volatile memory, a random-access-memory (RAM), and/or a non-volatile memory (e.g., a read-only-memory (ROM) or a flash RAM). A memory is an example of a computer-readable medium.

Computer-readable mediums include volatile, non-volatile, portable, and non-portable mediums. They can be used in any method or technique to implement information storage. The information can be computer-readable commands, data structures, program modules, or other data. The readable mediums disclosed include, but are not limited to, phase-change memory (PRAM), static random-access memory (SRAM), dynamic random-access memory (DRAM), other types of random-access memory (RAM), read-only memory (ROM), electrically erasable programmable read-only memory (EEPROM), flash RAM and other memory technologies, compact disc read-only memory (CD-ROM), digital video disc (DVD) and other optical storage, magnetic tape, magnetic disc and other magnetic storage, and any other non-transition media. According to the present disclosure, the computer-readable mediums do not include transitory media, such as the modulate data signal and carrier.

It is also necessary to point out that, in the Claims and specification of the present disclosure, terms such as "first" and "second" only are for distinguishing an embodiment or an operation from another embodiment or operation. It does not require or imply that those embodiments or operations have any such real relationship or order. Further, as used herein, the terms "comprising," "including," or any other variation intended to cover a non-exclusive inclusion, such that a process, method, article, or apparatus that comprises a list of elements does not include only those elements, but may include other elements not expressly listed or inherent to such process, method, article, or apparatus. Absent further limitation, elements recited by the phrase "comprising a" do not exclude a process, method, article, or apparatus that comprises such elements from including other same elements.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for voice controlling applications, the method comprising:
   receiving a voice command;
   transforming the voice command into a number of words;
   determining a command type with a processor that matches one or more words of the number of words to one or more preset words of a plurality of preset words that are associated with a plurality of command types to determine the command type;

determining an unlaunched application with the processor by determining which unlaunched application has a number of associated words that are related to one or more words of the number of words when the command type is an initial command, and a launched application with the processor by determining which launched application has a number of associated words that are related to one or more words of the number of words when the command type is a procedural command; and launching with the processor the unlaunched application; wherein the number of words is a phrase;

wherein determining a command type comprises:
determining a meaning or semantic of the phrase; and
determining whether the meaning of the phrase matches one or more preset command meanings.

2. The method of claim 1, wherein determining a launched application when the command type is the procedural command comprises:
determining whether one or more words of the number of words are related to a number of words associated with an application in a foreground; and
when one or more words of the number of words are related to the application in the foreground, sending the procedural command to the application in the foreground.

3. The method of claim 2, wherein determining a launched application when one or more words of the number of words are unrelated to the application in the foreground comprises:
determining an application in a background that has a number of associated words that are related to the one or more words of the number of words; and
sending the procedural command to the application in the background.

4. The method of claim 2, wherein:
the number of words comprises one or more keywords; and
when a plurality of first applications are simultaneously running in the foreground, the plurality of first applications have a plurality of interfaces such that each first application has an interface, each interface having one or more associated keywords,
further comprising:
generating a plurality of preset set stacks for the plurality of interfaces of the plurality of first applications such that each preset set stack has an interface of a first application of the plurality of first applications;
searching the preset set stacks for a matching set stack that has an interface with associated keywords that match the one or more keywords;
identifying a corresponding application that corresponds to the matching set stack; and selecting the corresponding application as the first application of the plurality of first applications that is related to the voice command.

5. The method of claim 1, wherein:
the number of words have a meaning or semantic; and
when a plurality of first applications are simultaneously running in the foreground, the plurality of first applications have a plurality of interfaces such that each first application has an interface, each interface having one or more associated semantics,
further comprising:
generating a plurality of preset set stacks for the plurality of interfaces of the plurality of first applications such that each preset set stack has an interface of a first application of the plurality of first applications;
searching the preset set stacks for a matching set stack that has an interface with associated semantics that match a semantic of the number of words;
identifying a corresponding application that corresponds to the matching set stack; and
selecting the corresponding application as the first application of the plurality of first applications that is related to the voice command.

6. The method of claim 2, further comprising:
receiving a launching command;
starting a timer in response to receiving the launching command;
displaying a prompt window in response to receiving the launching command;
displaying the number of words in the prompt window in response to transforming the voice command; and
cancelling the launching command if the timer expires without receiving the voice command.

7. The method of claim 6, wherein the prompt window:
displays information suggesting that a user input the voice command;
displays the voice command when the voice command is received;
displays an execution result when an execution result is sent from the first application that received the procedural command after the first application that received the procedural command has executed the procedural command; and
hides when receiving a hide command, or when no voice command input by the user is received during a first preset time interval.

8. The method of claim 7, wherein the prompt window is a floating window that occupies a portion of an entire display screen.

9. The method of claim 7, further comprising displaying hint information to suggest an error when no execution result is sent from the first application that received the procedural command during a time interval that begins after the procedural command has been sent.

10. The method of claim 1, wherein the one or more words of the number of words is a number of keywords.

11. The method of claim 10, wherein: determining a command type comprises determining whether one or more keywords of the number of words matches one or more stored command keywords.

12. An apparatus for voice controlling applications, the apparatus comprising:
a main memory that stores instructions; and
a processor coupled to the main memory, the processor to execute the instructions stored in the main memory to:
receive a voice command,
transform the voice command into a number of words;
determine a command type by matching one or more words of the number of words to one or more preset words of a plurality of preset words that are associated with a plurality of command types to determine the command type;
determine an unlaunched application by determining which unlaunched application has a number of associated words that are related to one or more words of the number of words when the command type is an initial command, and a launched application by determining which launched application has a number of associated words that are related to one or more words of the number of words when the command type is a procedural command; and
launch the unlaunched application;
wherein the number of words is a phrase;
wherein determine a command type comprises:
determine a meaning or semantic of the phrase; and
determine whether the meaning of the phrase matches one or more preset command meanings.

13. The apparatus of claim 12, wherein when the command type is the procedural command, the processor to further:
determine whether one or more words of the number of words are related to a number of words associated with an application in a foreground; and
when one or more words of the number of words are related to the number of words associated with an application in the foreground, send the procedural command to the application in the foreground.

14. The apparatus of claim 13, wherein when one or more words of the number of words are unrelated to the application in the foreground, the processor to further:
determine an application in a background that has a number of associated words that are related to the one or more words of the number of words; and
send the procedural command to the application in the background.

15. A non-transitory computer-readable storage device and comprising instructions that when executed by a processor perform a method of voice controlling applications, the method comprising:
receiving a voice command;
transforming the voice command into a number of words;
determining a command type that matches one or more words of the number of words to one or more preset words of a plurality of preset words that are associated with a plurality of command types to determine the command type;
determining an unlaunched application by determining which unlaunched application has a number of associated words that are related to one or more words of the number of words when the command type is an initial command, and a launched application by determining which launched application has a number of associated words that are related to one or more words of the number of words when the command type is a procedural command; and
launching the unlaunched application;
wherein the number of words is a phrase;
wherein determining a command type comprises:
determining a meaning or semantic of the phrase; and
determining whether the meaning of the phrase matches one or more preset command meanings.

16. The method of claim 15, wherein determining a launched application when the command type is the procedural command comprises:
determining whether one or more words of the number of words are related to a number of words associated with an application in a foreground; and
when one or more words of the number of words are related to the application in the foreground, sending the procedural command to the application in the foreground.

17. The method of claim 15, wherein the method further comprises:
receiving a launching command;
starting a timer in response to receiving the launching command;
displaying a prompt window in response to receiving the launching command;
displaying the number of words in the prompt window in response to transforming the voice command; and
cancelling the launching command if the timer expires without receiving the voice command.

18. The method of claim 16, wherein determining a launched application when one or more words of the number of words are unrelated to the application in the foreground comprises:
determining an application in a background that has a number of associated words that are related to the one or more words of the number of words; and
sending the procedural command to the second application in the background.

* * * * *